(12) United States Patent
Os et al.

(10) Patent No.: US 6,781,610 B2
(45) Date of Patent: Aug. 24, 2004

(54) MOTOR VEHICLE MULTIMEDIA SYSTEM HAVING ANIMATED DISPLAY

(75) Inventors: Marcel Van Os, Tilburg (NL); Peter Verbeek, St. Nom la Breteche (FR)

(73) Assignee: Siemens AG (DE)

( * ) Notice: Subject to any disclaimer, the term of this patent is extended or adjusted under 35 U.S.C. 154(b) by 0 days.

(21) Appl. No.: 09/970,264

(22) Filed: Oct. 3, 2001

(65) Prior Publication Data

US 2002/0093539 A1 Jul. 18, 2002

(30) Foreign Application Priority Data

Oct. 4, 2000 (EP) ............................................. 00121643

(51) Int. Cl.⁷ ........................... G09G 5/00; G08G 1/123
(52) U.S. Cl. ....................... 345/764; 345/716; 345/767; 345/771; 345/798; 345/815; 345/821; 345/848; 345/854; 345/473; 340/990; 340/995; 340/14
(58) Field of Search ................................ 345/700, 716, 345/717, 719, 764, 767, 771, 781, 788, 798–802, 810, 815, 821–824, 835, 836, 839–841, 848, 849, 852–855, 660, 473, 173; 701/200, 208, 211; 340/990, 995

(56) References Cited

U.S. PATENT DOCUMENTS

| | | | | |
|---|---|---|---|---|
| 5,089,826 A | * | 2/1992 | Yano et al. ................. | 342/457 |
| 5,539,429 A | | 7/1996 | Yano et al. ................. | 345/173 |
| 5,565,888 A | * | 10/1996 | Selker ......................... | 345/823 |
| 5,847,704 A | * | 12/1998 | Hartman ..................... | 345/764 |
| 5,956,035 A | * | 9/1999 | Sciammarella et al. ..... | 345/815 |
| 6,043,818 A | * | 3/2000 | Nakano et al. ............. | 345/851 |
| 6,049,336 A | * | 4/2000 | Liu et al. .................... | 345/830 |
| 6,201,540 B1 | * | 3/2001 | Gallup et al. .............. | 345/764 |
| 6,653,948 B1 | * | 11/2003 | Kunimatsu et al. .... | 340/995.19 |
| 6,667,726 B1 | * | 12/2003 | Damiani et al. ............ | 345/1.1 |

FOREIGN PATENT DOCUMENTS

| | | |
|---|---|---|
| DE | 198476108 | 4/2000 |
| WO | WO99/35008 | 7/1999 |
| WO | WO00/17740 | 3/2000 |

* cited by examiner

*Primary Examiner*—Sy D. Luu
(74) *Attorney, Agent, or Firm*—Mayer, Brown, Rowe & Maw LLP

(57) ABSTRACT

Disclosed is a motor vehicle multimedia system comprising: a display apparatus; a control unit for actuating the display apparatus; and a selection apparatus for a first plurality of selection areas display on the display apparatus; wherein selecting one of the plurality of selection areas using the selection apparatus retrieves a submenu visible via an animation wherein the size and/or position of at least some of the plurality of displayed first selection areas are continuously altered to create a display space for displaying a submenu comprising one or more additional selection areas.

20 Claims, 11 Drawing Sheets

MOTOR VEHICLE MULTIMEDIA SYSTEM HAVING ANIMATED DISPLAY

BACKGROUND OF THE INVENTION

1. Field of the Invention

The invention relates to a motor vehicle multimedia system having a display apparatus, actuated by a control unit, and a selection apparatus for first selection areas displayed on the display apparatus, where selecting a selection area using the selection apparatus is sued to retrieve a submenu linked to the selected selection area. The invention also relates to a method for arranging selection areas on a display apparatus in a motor vehicle multimedia system.

2. Background of the Related Art

Apart from car radios, which have been known for a long time, further entertainment options and communication functions are increasingly being made available in motor vehicles. In this case, in particular, a plurality of functions are arranged in an individual multimedia system. Such a multimedia system generally has a central control device which is linked to a display apparatus and to a control apparatus and also to the various functional modules. The functions which such a motor vehicle multimedia system may include may comprise, by way of example, the functions of a car radio, a CD player, a CD changer, a navigation system, a telephone and Internet access. Owing to the wide range of functions which can be carried out, user-friendly operation of the multimedia system is of particular importance in motor vehicle applications.

WO 99/35008 discloses a graphical user interface for use in motor vehicles. In this user interface, the various functions which can be selected are represented on a display apparatus by symbols, which are frequently also referred to as "icons". A specific icon is in this case selected by "scrolling" or rolling, by which means all the icons on the display apparatus are moved past the viewed in one direction, in this case from right to left or vice versa, and only some of the icons can be seen at any time. According to WO 99/35008, a selected screen position is provided for activating a function linked to an icon. After such activation, settings appropriate to this function can be made. One particular drawback of this embodiment is that, once a function has been selected, the icons disappear from the display apparatus, which means that it is necessary to return to the main menu before a new function can be selected by selecting a new icon.

U.S. Pat. No. 5,847,704 discloses a further display apparatus for motor vehicles, on which different displays can be produced. However, in the system described there, the individual functions are not selected by selecting icons or the like on the display apparatus, but rather by separate control buttons. Each system function is assigned such a control button. This means that the system requires a large number of control buttons. The display apparatus itself can display different information items, with a distinction being made between information which is required to drive the vehicle and additional information or additional functions. The former group includes, by way of example, the speed display, while the additional functions include the air conditioning or a telephone function. Speed and the like should always be displayed, irrespective of the display of additional information. Thus, if the control buttons are used to select the display of additional functions, the speed display is pushed to the edge area of the display apparatus and is displayed in a rotated form. In this way, display space is gained for displaying the additional functions in the central area of the display apparatus. A drawback of this embodiment is that a large number of control buttons are required. In addition, there are no details as to how the display can be changed in a user-friendly manner.

SUMMARY OF THE INVENTION

It is an object of embodiments of the invention to specify a motor vehicle multimedia system having a user-friendly display, in particular when retrieving submenus. Furthermore, in one specific object, the aim is to ensure a rapid change to a new function without a large number of selection buttons being required. A further object is to specify a method for user-friendly arrangement of selection areas on a display apparatus.

For one embodiment of a generic motor vehicle multimedia system, the first-mentioned object is achieved in that, after selection of a selection area, the display apparatus is actuated by the control unit in the form of an animation running on the display unit, the size and/or position of at least some of the displayed first selection areas being continuously altered in order to create display space for displaying further selection areas for a submenu for the selected selection area, and the selection areas of the submenu being produced in an animation on the display apparatus.

The transition between different displays on the display apparatus after a particular function has been selected therefore does not take place abruptly, but rather, by means of the animation, in a sequence of pictures which result in a sequential movement for the user. In this case, not only are/is the size and/or position of at least some of the first selection areas continuously altered by means of an animation, but also the additional selection areas of the submenu are produced continuously on the screen by means of an animation. For this purpose, the display apparatus is actuated in an appropriate manner, known per se, by the control unit, with, by way of example, a sequence of pictures being produced by the control unit. In particular, the brightness of the displays to be displayed in the submenu can be continuously increased for a prescribed time period as part of the animation of the submenus to be displayed for the first time.

A further aspect of embodiment of the invention is that at least some of the selection areas preferably contain symbols in a three-dimensional (3D) display for identifying the selection areas. These symbols, which are frequently also referred to as icons, are intended to make it easier for the user to use the overall system intuitively, in particular, in that the symbols indicate the function linked to the selection area. In particular, the three-dimensional symbols can be put into rotary motion during the animation, which gives the viewer an altering view of the 3D symbol. This impression is likewise produced by a sequence of different views of the 3D symbols which are passed on from the control unit to the display apparatus.

In one particular embodiment, the animation is effected such that the unselected first selection areas are moved out of a display area on the display apparatus by the selected selection area. This results in a smooth transition between the display of submenus for a selected selection area. This type of display is particularly suitable when a large display area is required for displaying the submenu for the selected selection area. This can be done, in particular, by virtue of the selected selection area being first enlarged in a first phase of the animation in order to move the unselected selection areas out of the display area on the display apparatus, and being reduced in size in a second phase of the animation in order to create the display space for displaying the selection areas of the submenu.

In another embodiment, the animation is effected such that the size of the unselected first selection areas is reduced, but the selection areas continue to be selectable using the selection apparatus. In this embodiment, the appropriate display space is likewise created on the display apparatus by reducing the size of the unselected first selection areas and by altering their position. In contrast to the embodiment described above, the unselected selection areas and by altering their position. In contrast to the embodiment described above, the unselected selection areas continue to remain visible, however, and can thus also be selected. This refinement has the particular advantage that it is a particularly easy matter to select a new selection area, since all the first selection areas can always still be selected.

Combination of said embodiments are possible. Thus, some of the selection areas can be moved from the display apparatus by the selected selection area, while the size and position of the remaining display areas are altered but they remain visible and selectable.

In one specific refinement of the invention, the symbol in one or more selection areas is masked out by the animation. To create the necessary display space for the submenus, the size of the first selection areas is reduced, as described above. It is thus possible for the size of the symbol for identifying the selection area to be reduced until it cannot be identified. To prevent this, the symbol is masked out by the animation, according to the invention. This means that the symbol is also masked out by a sequence of pictures. In that case, by way of example, only an alphanumeric display remains to identify the selection area.

In another specific refinement of the invention, the animation continuously changes the color of at least one selection area. In this case, the color of unselected selection areas, in particular, can be continuously changed such that they merge into the background but continue to be visible and selectable.

The selection apparatus can either be designed to be separate from the display apparatus or integrated into it. In the latter case, it may be, in particular, a touch-sensitive screen (touch screen). The inventive multimedia system can be fitted into the motor vehicle at the manufacturer's, but may also, in particular, be intended for retrospective fitting into the motor vehicle and, by way of example, may be of the same size and shape as conventional car radios.

The multimedia system may also be part of a higher-level motor vehicle system, for example an onboard computer. Such an onboard computer carries out additional functions, going beyond the multimedia system, such as control of heating and air conditioning. In this case, in particular, selection areas for those functions which go beyond the multimedia system are also displayed on the shared display apparatus. These additional selection areas may also be included in the described animation.

Another embodiment of the invention includes a method for arranging selection areas on a display apparatus in a motor vehicle multimedia system comprising the steps of selecting one of a plurality of selection areas; starting an animation phase; during the animation phase, continuously altering the size and/or position of at least some of the displayed selection areas in order to create display space for displaying further selection areas for a submenu for the selected selection area, and producing the selection areas of the submenu in an animation on the display apparatus.

BRIEF DESCRIPTION OF THE DRAWINGS

The invention is explained in more detail below with reference to exemplary embodiments and the drawing, in which:

FIG. 2j depicts an animation stage on a display unit according to an animation in accordance with an embodiment of the invention, FIG. 3*j* depicts an animation stage on a display unit according to an animation in accordance with another embodiment of the invention.

DETAILED DESCRIPTION OF PREFERRED EMBODIMENTS

Figure 1:
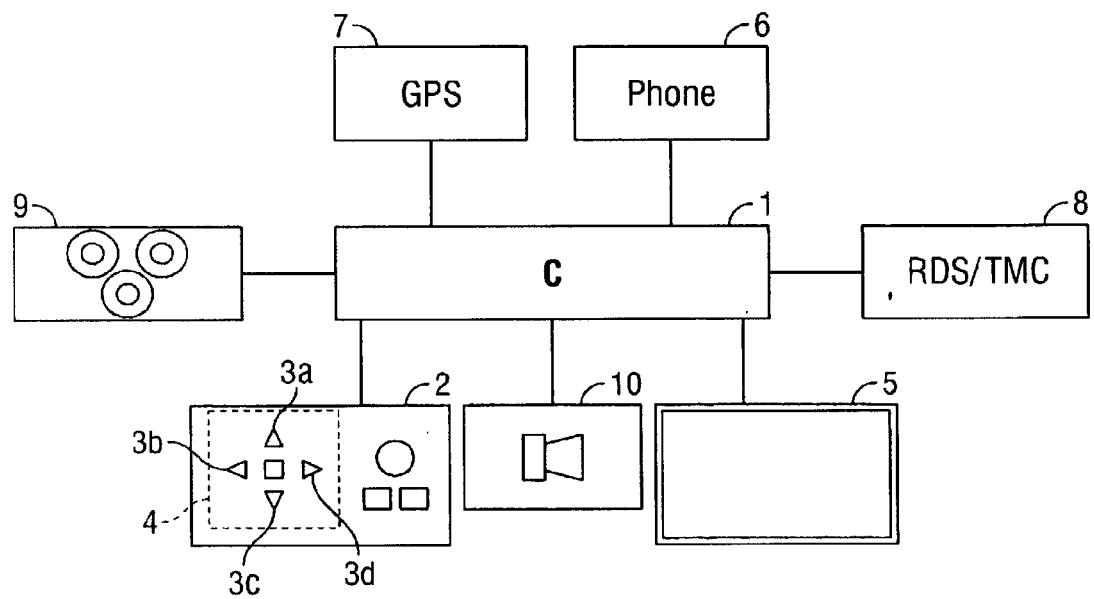
FIG. 1 shows a block diagram of a multimedia system.

FIG. 1 shows a block diagram of a motor vehicle multimedia system. The central component of the system is the control unit 1. The control unit 1 contains, by way of example, a microprocessor and the associated memory elements and carries out the control of the connected modules using an appropriate program. Connected to the control unit 1 is an operating unit 2 which, in the form of the direction arrows 3, contains a selection apparatus 4 for selection areas which are displayed on the display apparatus 5. In alternative embodiments, the selection apparatus may also be, by way of example, in the form of a joystick, trackball or voice input system. A telephone module 6, a navigation module 7, a radio module 8 and a CD player module 9 are also connected to the central control unit 1 in this embodiment.

Via the telephone module 6, the multimedia system provides a hands-free device for an internal or external mobile telephone. The navigation module 7 allows the vehicle position to be determined, a route to be calculated and travel instructions to be output. Corresponding navigation systems are sufficiently well known and are in use in motor vehicles. The radio module 8 provides the known functions of a car radio. The CD playback module 9 allows an audio CD to be played, with the output being produced via the loudspeaker 10. In addition, the CD playback module 9 allows cartographic data to be read from an appropriate CD-ROM map for the navigation module 7. The system is operated using the operating unit 2, with the capability to select selection areas displayed on the display apparatus 5, in particular, for the various functions of the multimedia system using the selection apparatus 4 on the operating unit 2.

Figure 2A:
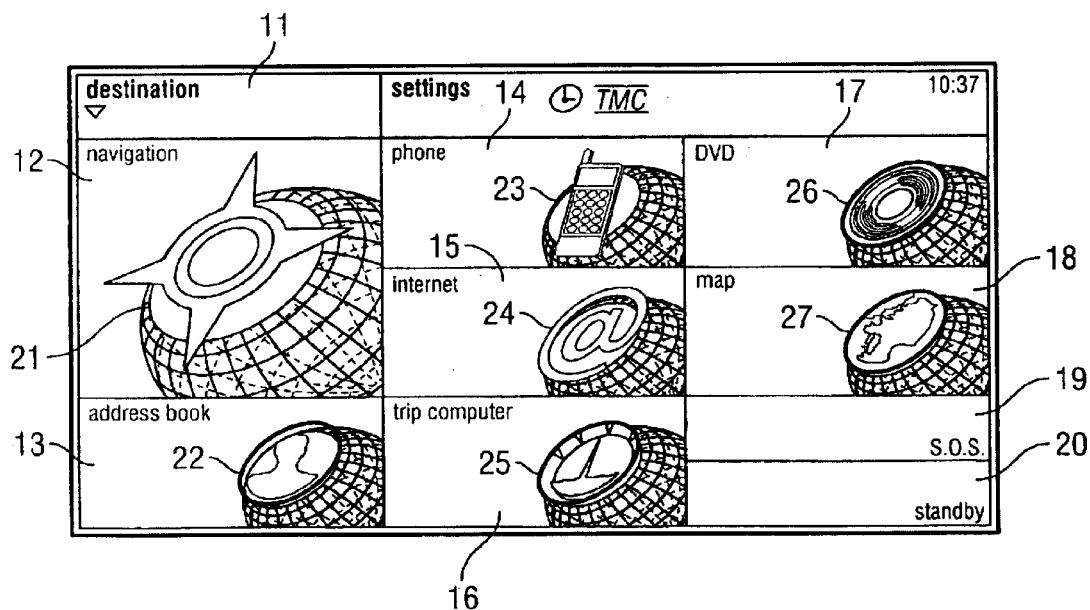
FIG. 2a depicts an animation stage on a display unit according to an animation in accordance with an embodiment of the invention.
Figure 2B:
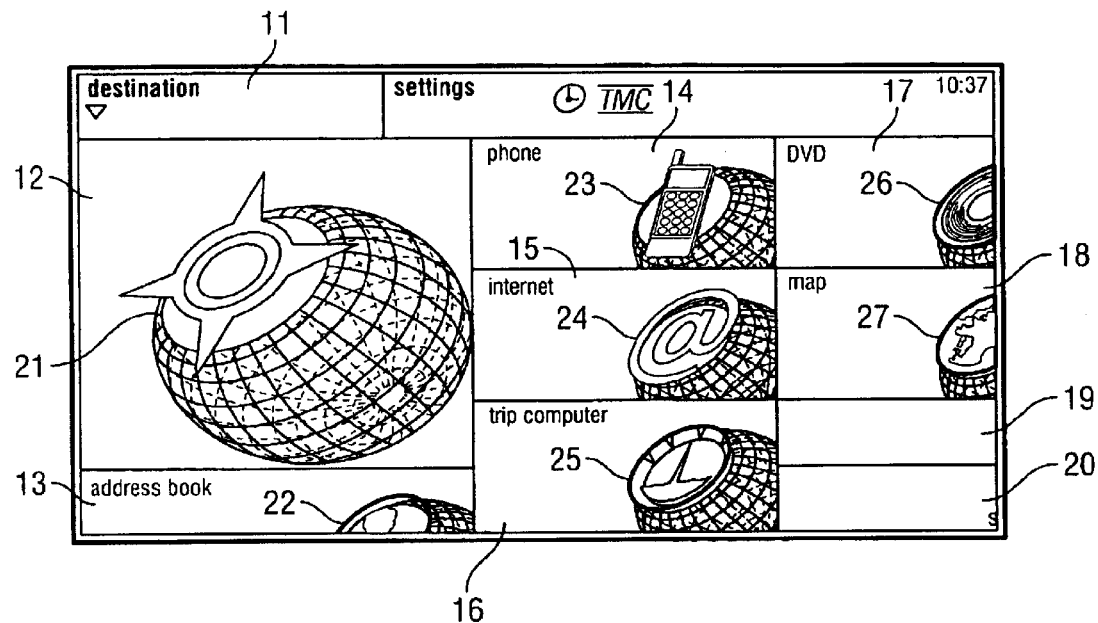
FIG. 2b depicts an animation stage on a display unit according to an animation in accordance with an embodiment of the invention.
Figure 2C:
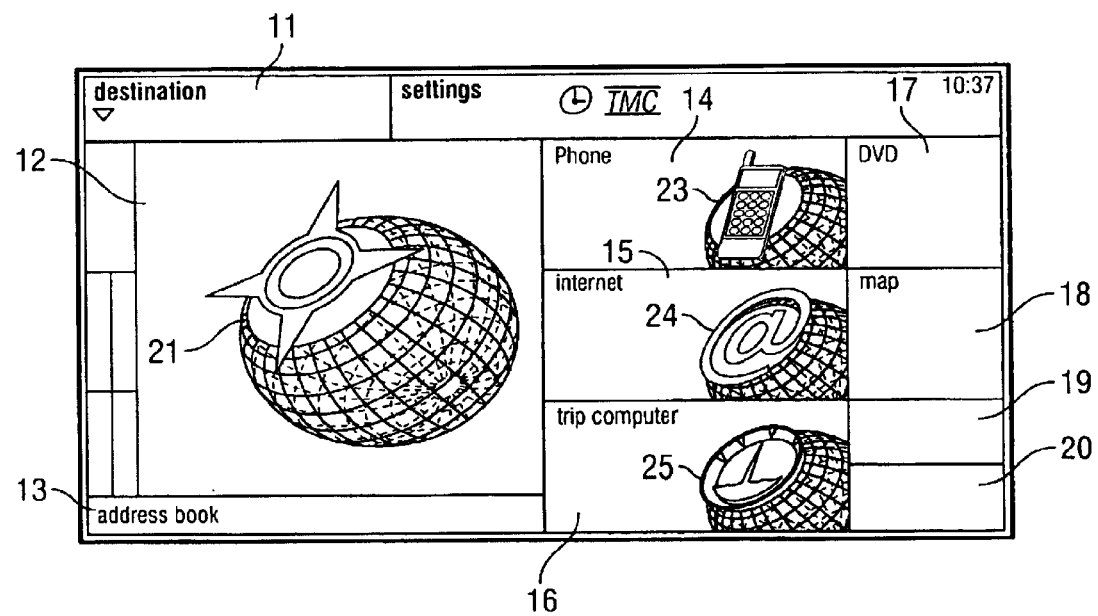
FIG. 2c depicts an animation stage on a display unit according to an animation in accordance with an embodiment of the invention.
Figure 2D:
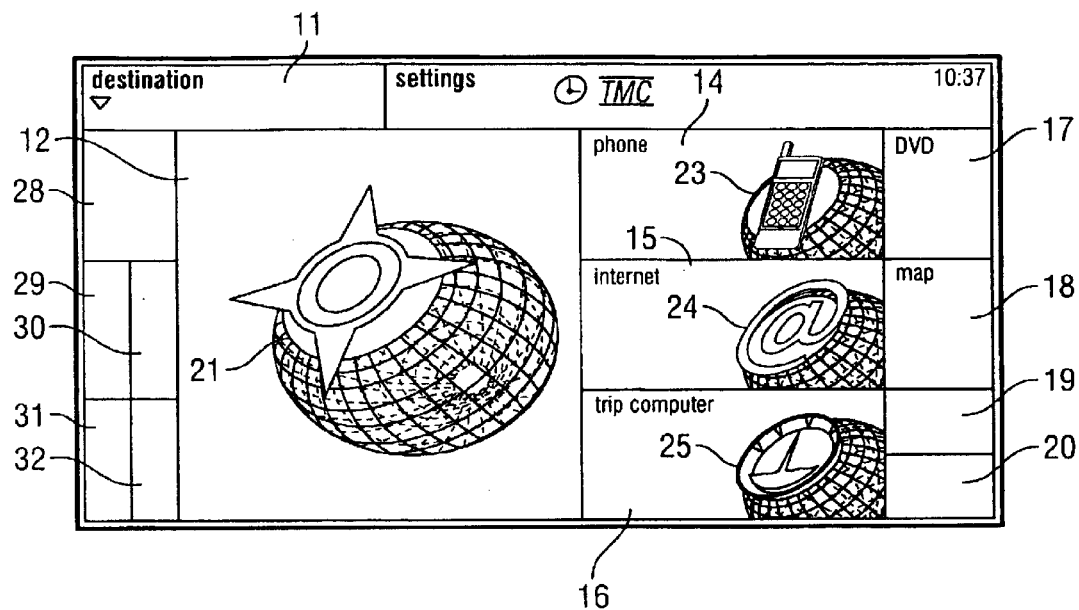
FIG. 2d depicts an animation stage on a display unit according to an animation in accordance with an embodiment of the invention.
Figure 2E:
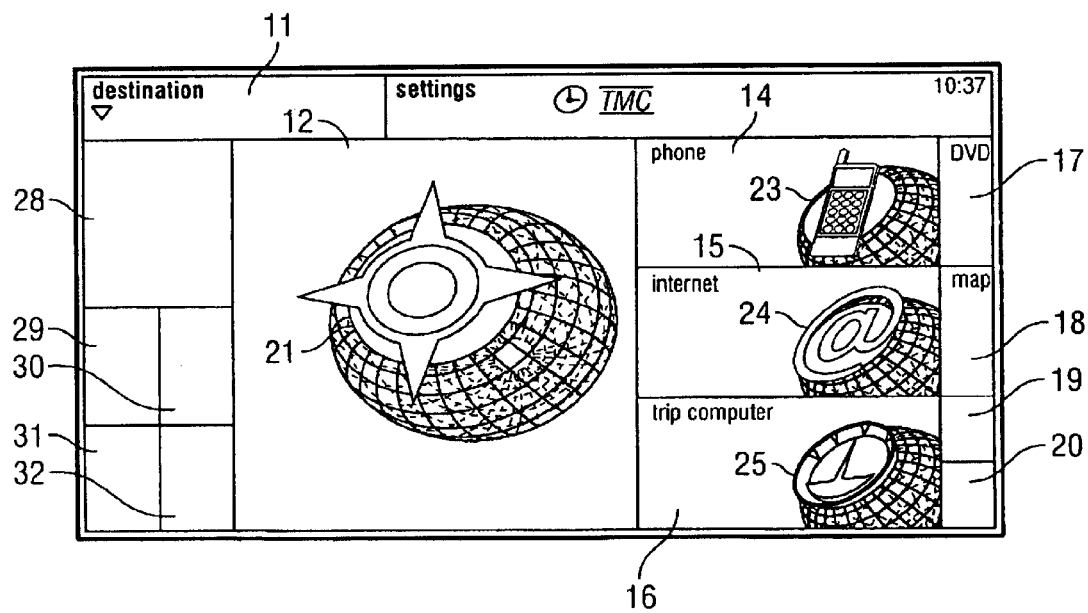
FIG. 2e depicts an animation stage on a display unit according to an animation in accordance with an embodiment of the invention.
Figure 2F:
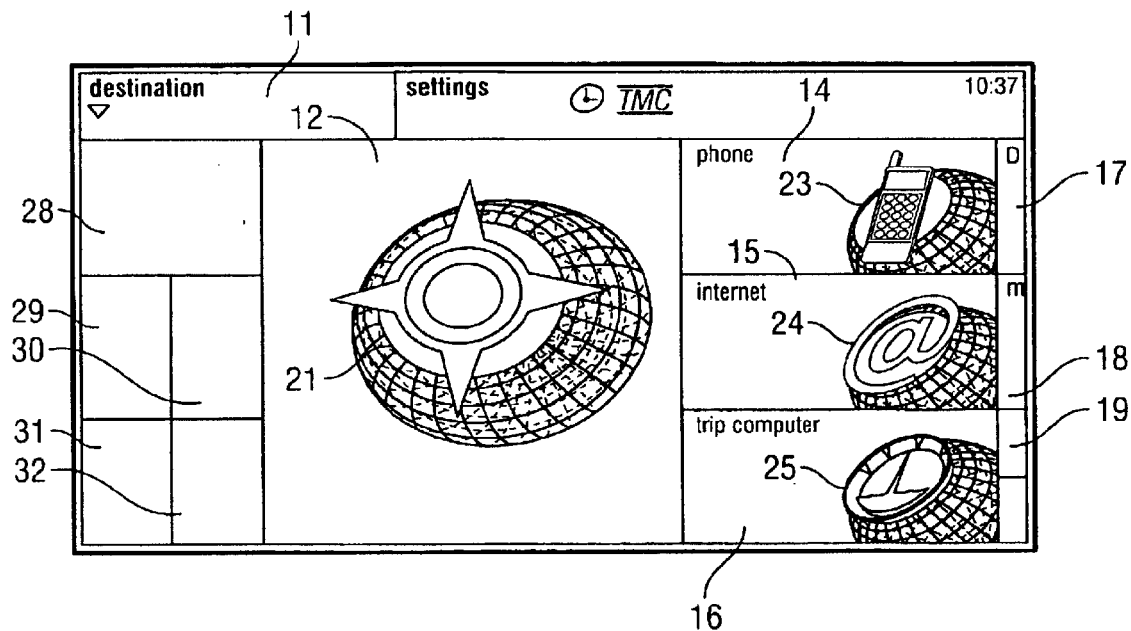
FIG. 2f depicts an animation stage on a display unit according to an animation in accordance with an embodiment of the invention.
Figure 2G:
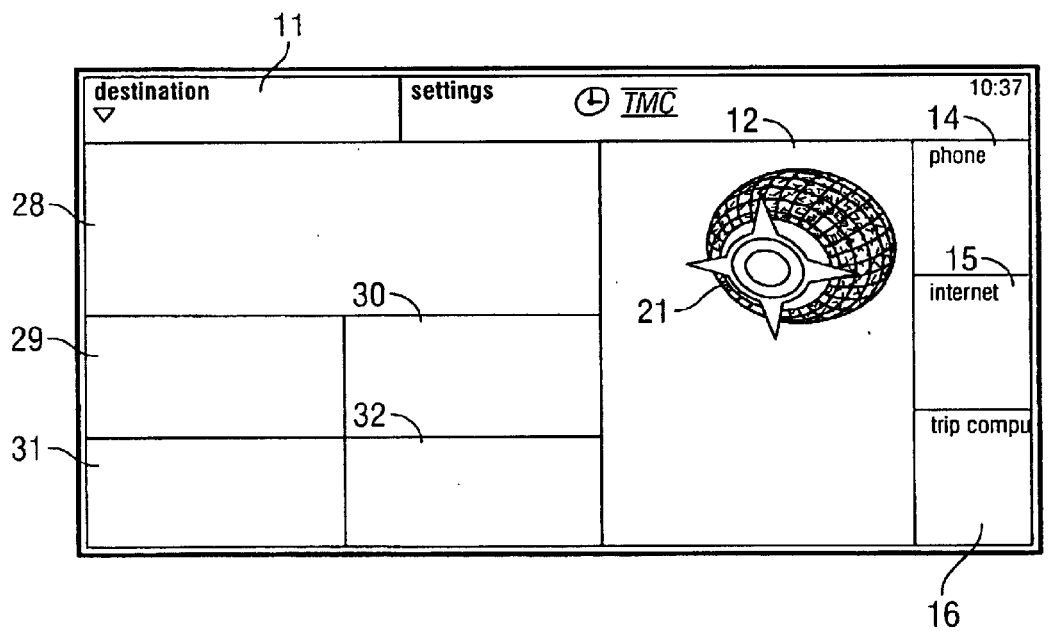
FIG. 2g depicts an animation stage on a display unit according to an animation in accordance with an embodiment of the invention.
Figure 2H:
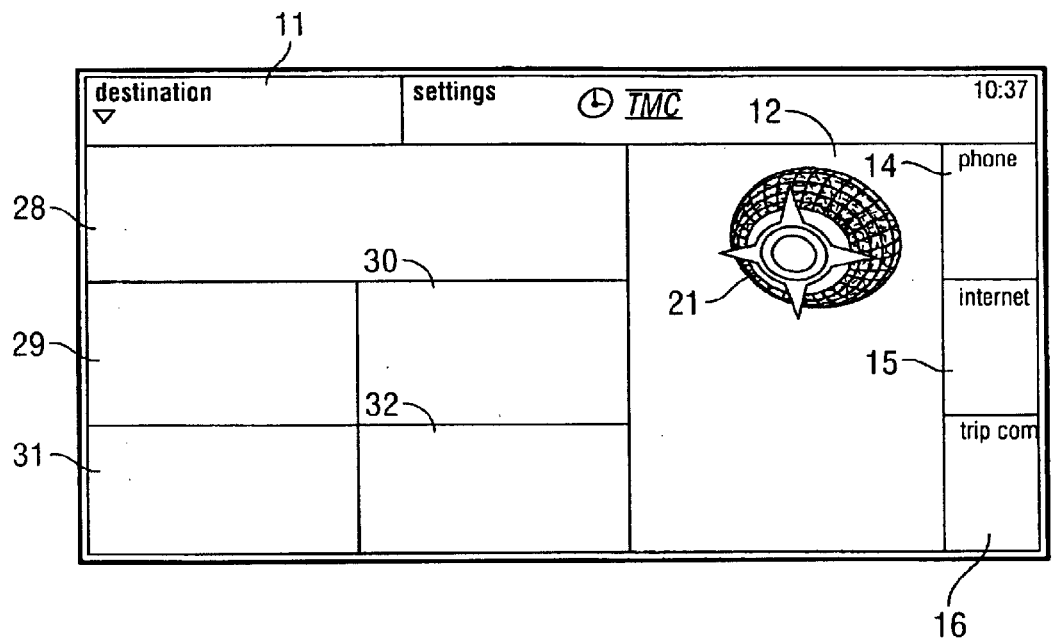
FIG. 2h depicts an animation stage on a display unit according to an animation in accordance with an embodiment of the invention.
Figure 2I:
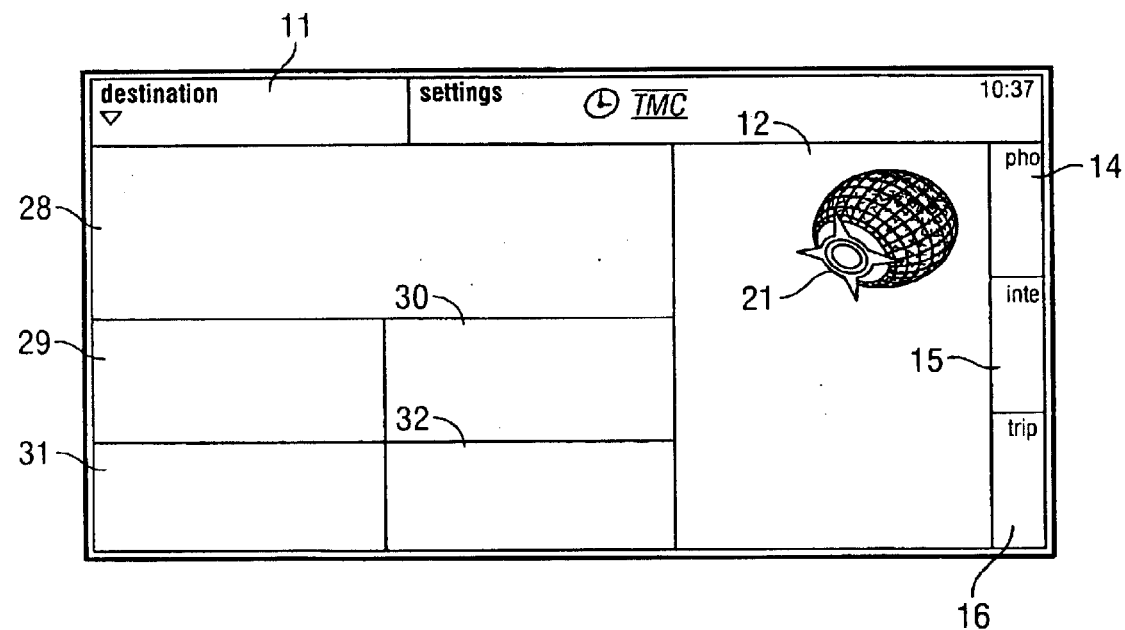
FIG. 2i depicts an animation stage on a display unit according to an animation in accordance with an embodiment of the invention.
Figure 2K:
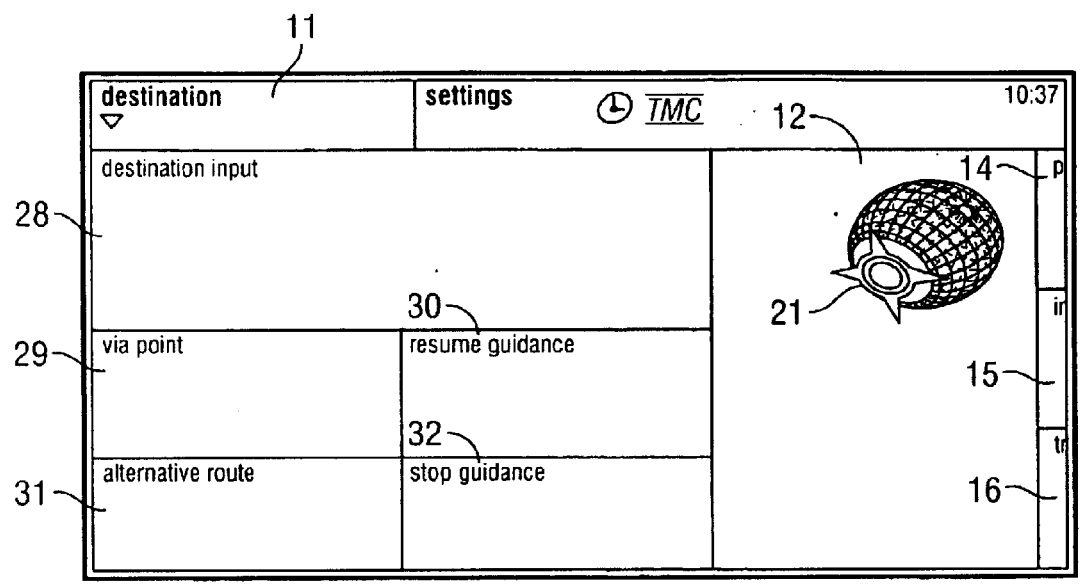
FIG. 2k depicts an animation stage on a display unit according to an animation in accordance with an embodiment of the invention.
Figure 2L:
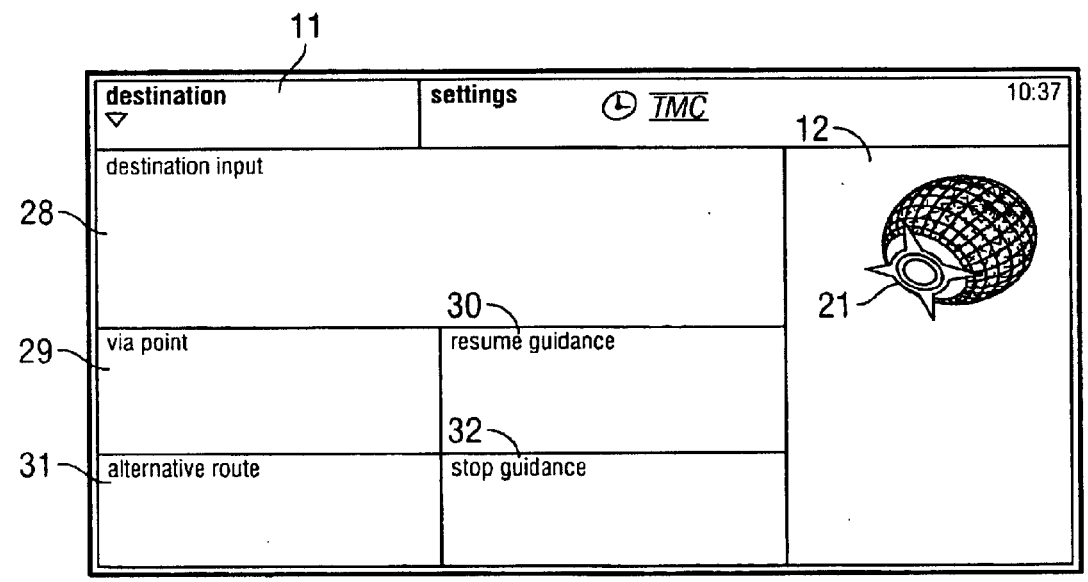
FIG. 2l depicts an animation stage on a display unit according to an animation in accordance with an embodiment of the invention.
Figure 3A:
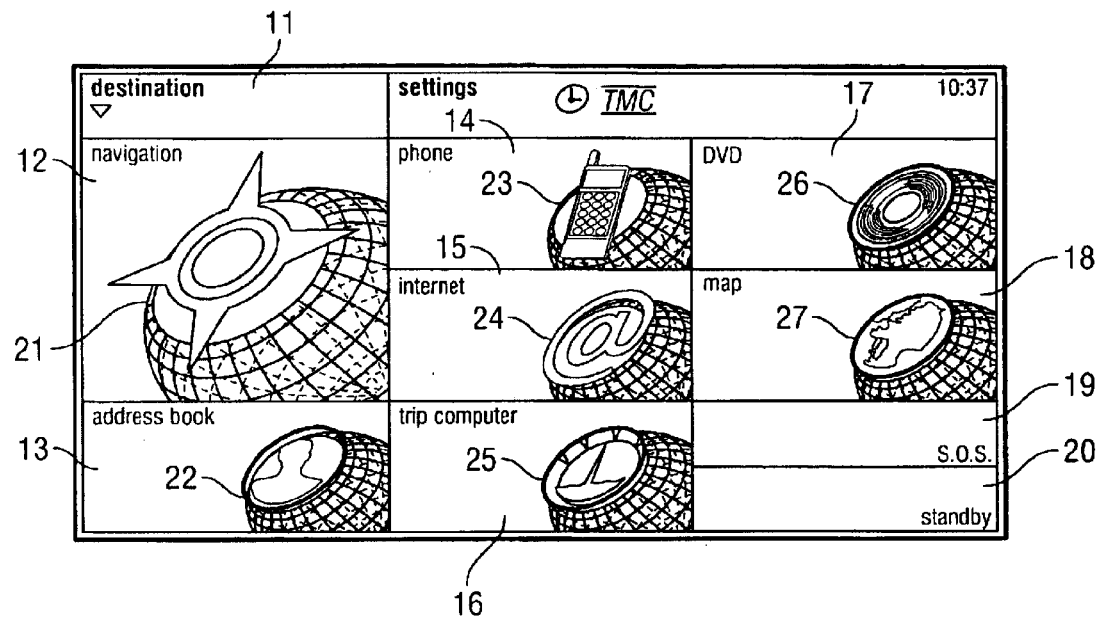
FIG. 3a depicts an animation stage on a display unit according to an animation in accordance with another embodiment of the invention.
Figure 3B:
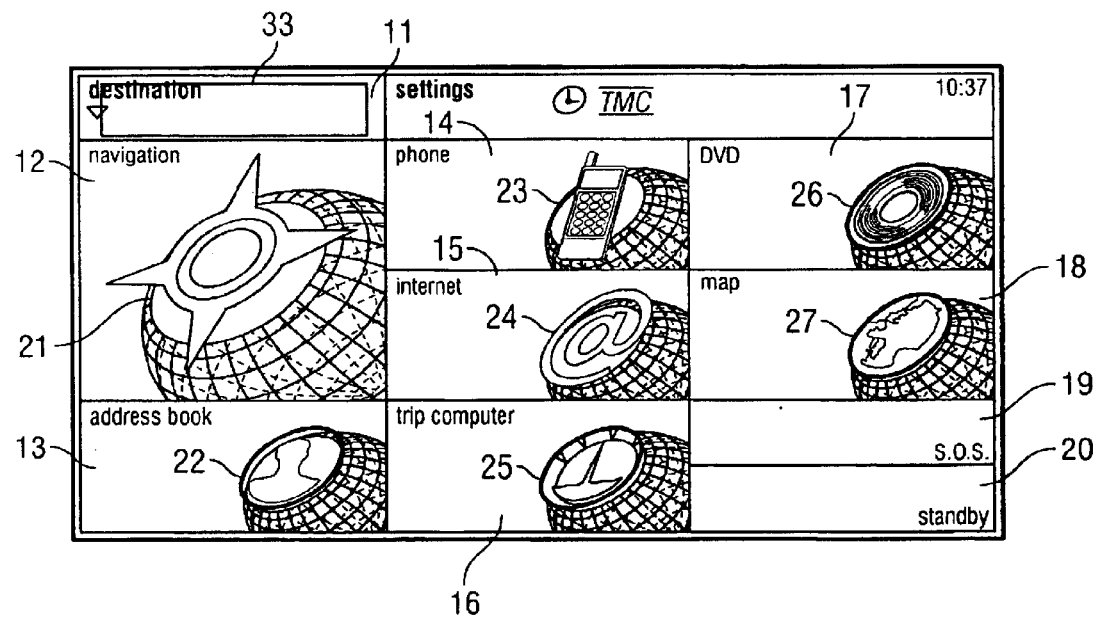
FIG. 3b depicts an animation stage on a display unit according to an animation in accordance with another embodiment of the invention.
Figure 3C:
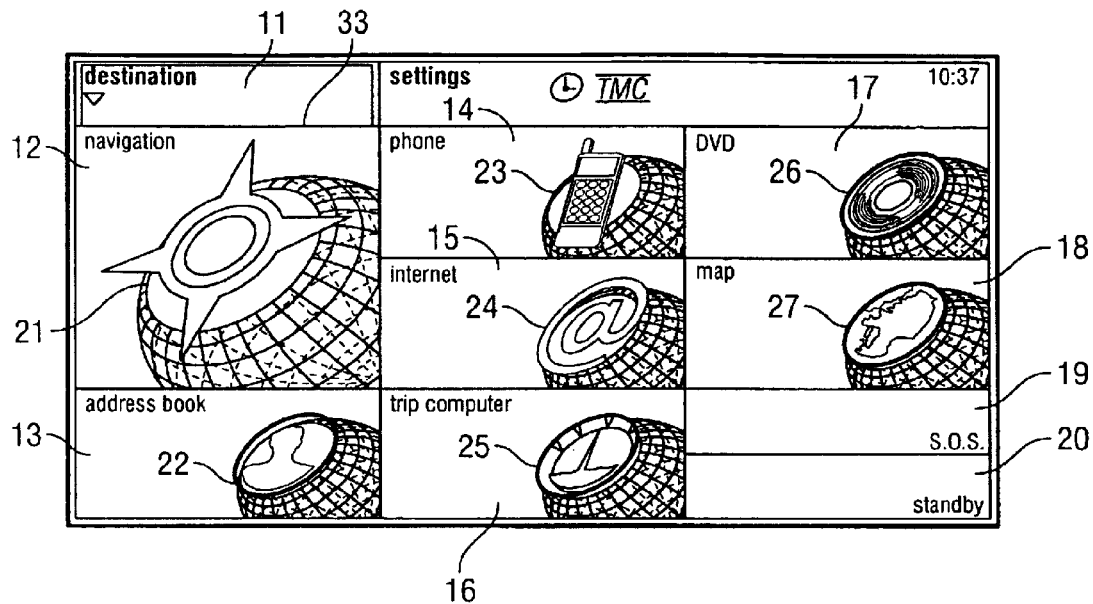
FIG. 3c depicts an animation stage on a display unit according to an animation in accordance with another embodiment of the invention.
Figure 3D:
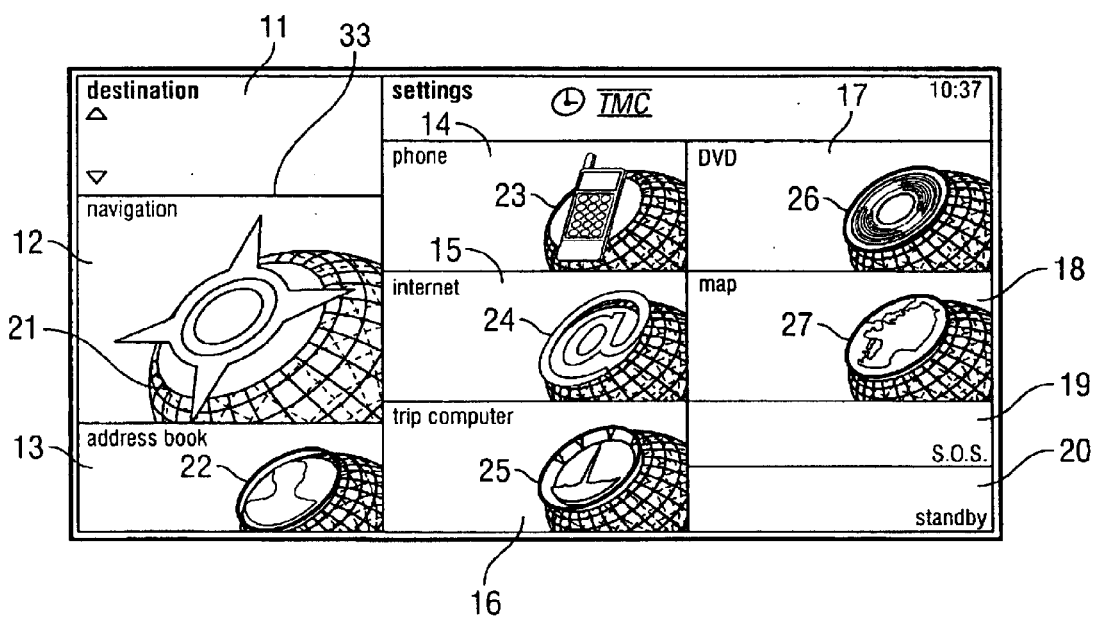
FIG. 3d depicts an animation stage on a display unit according to an animation in accordance with another embodiment of the invention.
Figure 3E:
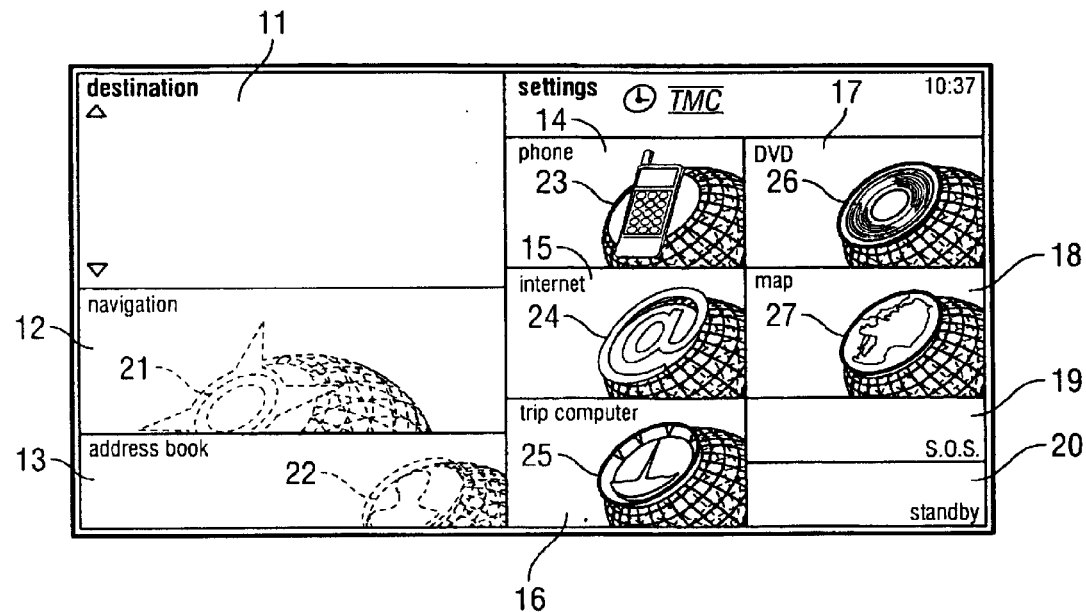
FIG. 3e depicts an animation stage on a display unit according to an animation in accordance with another embodiment of the invention.
Figure 3F:
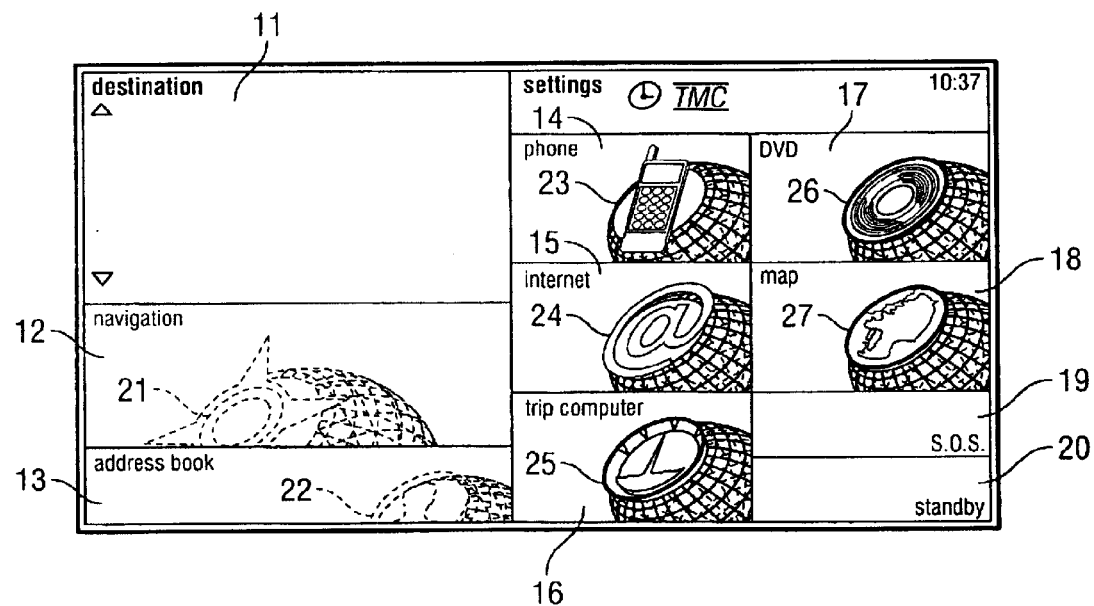
FIG. 3f depicts an animation stage on a display unit according to an animation in accordance with another embodiment of the invention.
Figure 3G:
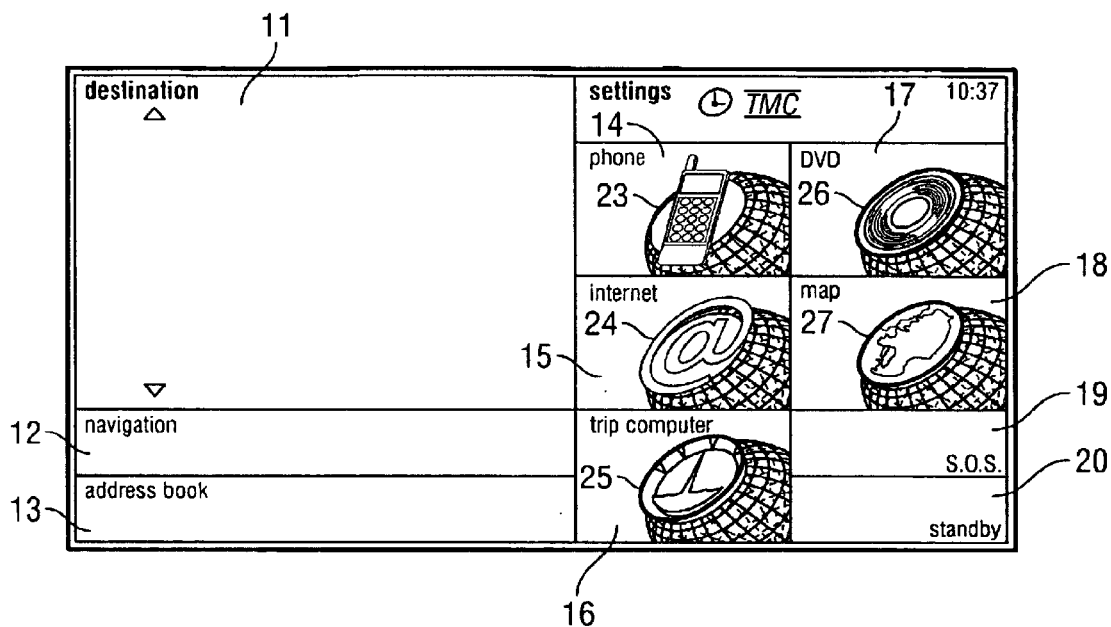
FIG. 3g depicts an animation stage on a display unit according to an animation in accordance with another embodiment of the invention.
Figure 3H:
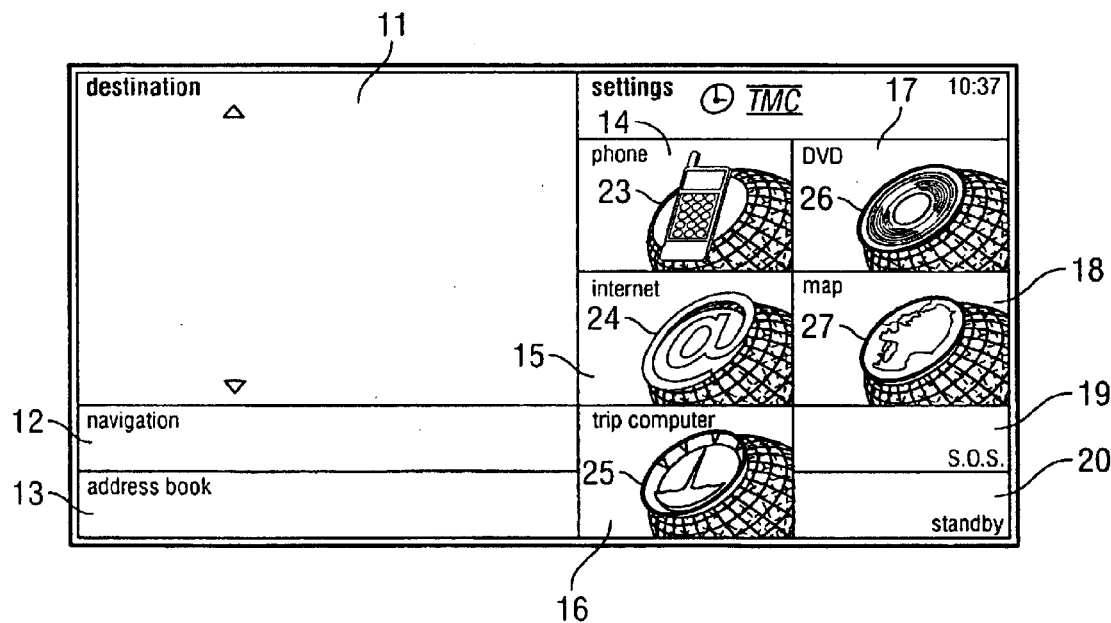
FIG. 3h depicts an animation stage on a display unit according to an animation in accordance with another embodiment of the invention.
Figure 3I:
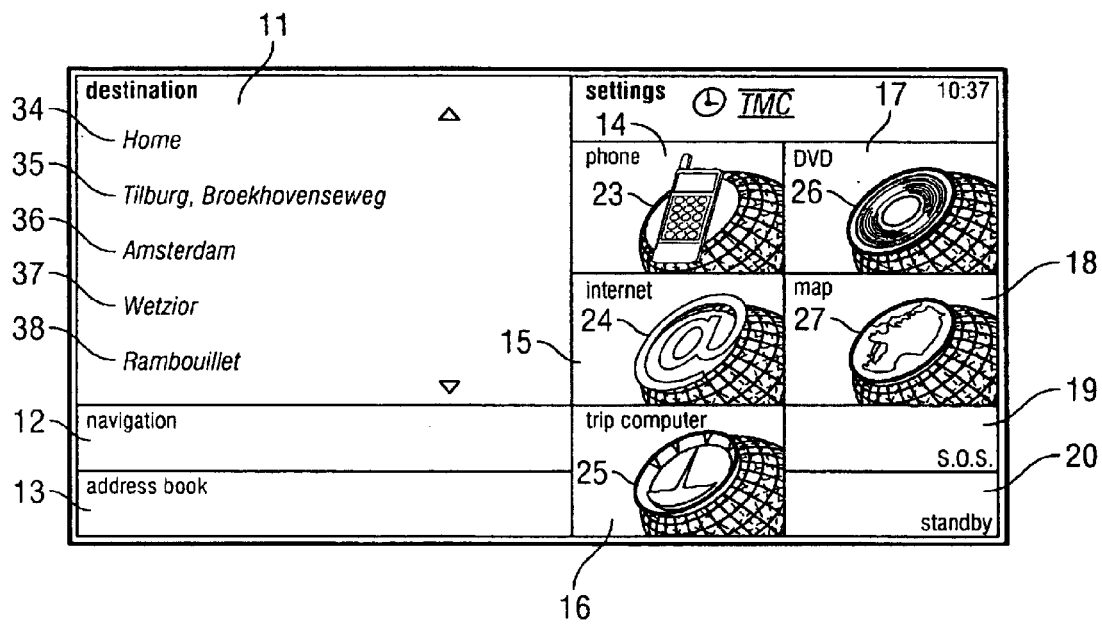
FIG. 3*i* depicts an animation stage on a display unit according to an animation in accordance with another embodiment of the invention.
Figure 3K:
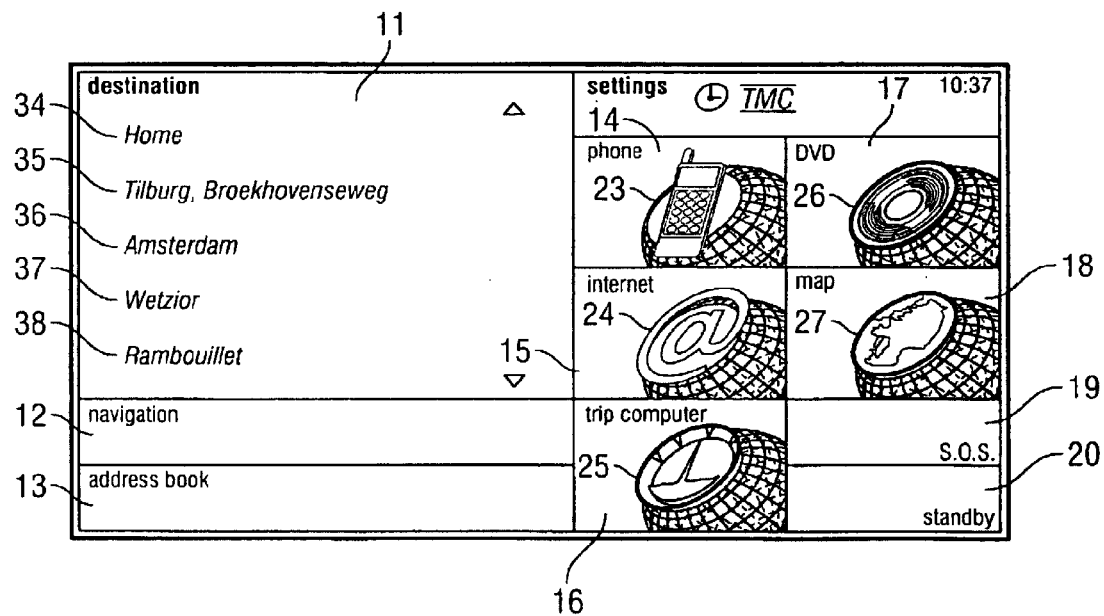
FIG. 3*k* depicts an animation stage on a display unit according to an animation in accordance with another embodiment of the invention.

FIG. 2*a* shows, by way of example, a first screen display on the display apparatus 5. In this case, various selection areas 11 to 20 are displayed. After selection of the selection area 11, it is possible to enter or select a destination for the vehicle routing. Selecting the selection area 12 retrieves a submenu for navigation functions. The selection area 13 can be used to retrieve a submenu for an address book. The telephone function is activated using the selection area 14. The selection area 15 initiates the necessary steps for setting up Internet access. The selection area 16 can be used to retrieve trip information. The selection area 17 starts playback of a CD or DVD. The selection area 18 can be used to retrieve a map display with map data. The selection area 19 is used to activate as SOS function, and the selection area 20 is used to switch to a standby mode.

Some of the selection areas 11 to 20 also have symbols 21 to 27 in 3D display which communicate the function of the respective selection area to the driver intuitively.

The direction keys 3 on the selection apparatus 4 can be used to select one of the selection areas. Selection of a selection area can be completed, in particular, by operating an enter key, although, by way of example, automatic selection of a chosen selection area is also possible without any additional action once a prescribed time interval has passed. In the example shown in FIG. 2, the selection area 12 has been selected, in order to retrieve the submenu for vehicle navigation.

After selection of a selection area, an animation process is started, during which the control unit 1 transmits a sufficient sequence of picture displays to the display apparatus 5 to give the impression of continuous movement. The corresponding picture information may in this case already be permanently stored in a memory element, as a result of which it is sufficient for the control unit 1 to have comparatively little computation power. The corresponding actuation signals for producing the picture sequence may, alternatively, be calculated while the animation is taking place using an appropriate program, if more computation power is available. The production of computer animations per se, to which reference is made here, is adequately known.

FIGS. 2*a* to 2*l* show a detail from a sequence according to the invention. During this sequence, the size of the selected area 12 is continuously increased. By contrast, the size of the remaining selection areas 13 to 20, or the size and relative arrangement of the symbols and characters displayed in the remaining selection areas 13 to 29, is kept unchanged. The animation now takes place in such a way that the arrangement of the selection areas with respect to one another is maintained, but the increase in the size of the selection area 12 has the effect of moving the rest of the selection areas 13 to 20 out of the display area on the display apparatus. During this process, the size of the selection areas 13 to 20 is maintained, but their position changes, os that some or all of the selection areas 13 to 20 fully or partly disappear from the display area during the animation.

Changing the position of the selection areas 13 to 20 prevents the selection area 12 from overlapping these selection areas as it becomes larger. New selection areas 28 to 32, which represent the submenu for the selected selection area 12, are likewise created in an animation in the display space created by the enlargement of the selection area 12. In the exemplary embodiment shown, the animation produces the effect of the new selection areas 28 and 32 moving in from the left-hand side of the screen. The new selection areas 28 to 32 are also identified by animation. In this case, the brightness of the alphanumeric identification of the selection areas 28 to 32 is continuously increased during the animation, so that this once again gives the viewer the impression of a continuous build-up. Instead of alphanumeric identification of the selection areas 28 to 32, they may also be identified by appropriate symbols (icons).

As can also be seen from the sequence in FIG. 2, the view of the symbols 21 to 27 also changes. This is achieved, in particular, by slow rotation of the symbols 21 to 27 throughout the animation phase. This further strengthens the viewer's impression of movement.

A second exemplary embodiment of the invention is shown in the form of a picture sequence in FIG. 3. The original display shown in FIG. 3*a* largely matches the original display shown in FIG. 2*a*. However, it is not yet possible to see in FIG. 3*a* which of the selection areas 11–20 has been selected. An appropriate frame 33 for the selection area 11, which frame indicates a selection which has been made, is produced only by an animation indicated in FIG. 3*b* and, finally, leads to the screen display 3*c*. In this case, the frame 33 can be produced, by way of example, on the basis of a point in the center of the picture in the selection area 11, with the animation resulting in the point on the picture becoming an enlarged rectangle which encloses the selection area 11.

As already mentioned, in the exemplary embodiment shown in FIG. 3, the selection area 11, which allows selection of a destination, has been selected. As can be seen from the picture sequence in FIG. 3, the selection area 11 is now first of all enlarged, as has already been described above in conjunction with FIG. 2 for the selection area 12. This enlargement of the selection area 11 occurs at the expense of the size of the remaining selection areas 12 to 20. Thus, in the exemplary embodiment shown in FIG. 3, apart from the position of the selection areas 12 to 20, their size is also changed. Finally, in an animation, the display of the selection areas 34 to 38 for location selection is generated in the enlarged selection area 11 (cf. FIGS. 3i and 3k). As described in conjunction with the previous example, the animation in this case takes place in such a way that the brightness of the displayed information, in this case the location names, is continuously increased. The location names are thus further selection areas 34 to 38.

This second exemplary embodiment has a further special feature, namely the masking out of the symbol 21 for vehicle navigation (cf. FIGS. 3d to 3g). To generate sufficient space to display the location names in the left-hand area of the screen, it is necessary to reduce the size of the navigation selection area 12 to a correspondingly great extent. Since this simultaneously results in a major reduction in the size of the associated symbol 21, the symbol 21 is masked out during navigation. This masking out is effected by continuously reducing the brightness of the symbol 21 until it can no longer be seen against the background of the screen. With a colored screen display, this masking out of the symbol 21 can also be effected by virtue of the color of the symbol 21 being matched to the color of the screen background in this area, so that the symbol can no longer be distinguished from the background.

The advantage of the embodiment shown in FIG. 3 is that the unselected selection areas 12 to 20 are also available for reselection at all times. This means that there is no need to jump to a higher-level main menu, thus greatly simplifying operation.

In the exemplary embodiments, the selection areas are always bounded by rectangular boxes arranged next to one another. Other configurations of the display areas can likewise be provided, for example a pentagonal or hexagonal shape. In addition, the selection area may be identified by any desired geometric area surrounding the respective symbol, without its boundaries needing to be visible to the viewer in detail. Such an embodiment provides the same level of convenience in terms of operability, since a selection area is generally selected using navigation keys which, when operated, automatically cause jumping between the selection areas. A chosen or selected selection area may in this case also be made identifiable by changing the color of the associated symbol, for example.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A motor vehicle multimedia system comprising:
   a display apparatus;
   a control unit for actuating the display apparatus; and
   a selection apparatus for selecting from among a first plurality of selection areas displayed on the display apparatus, wherein each of the selection areas relates to a particular feature of the system;
   wherein selecting one of the plurality of selection areas using the selection apparatus retrieves a submenu visible via an animation wherein the size and/or position of at least some of the plurality of displayed first selection areas are continuously altered to create a display space for displaying a submenu comprising one or more additional selection areas; and
   wherein upon display of the submenu, each of the first selection areas, when animated, is animated independently of the other selection areas.

2. The multimedia system as claimed in claim 1, wherein the unselected first selection areas are moved out of a display area on the display apparatus by the selected selection area.

3. The multimedia system as claimed in claim 2, wherein the selected selection area is first enlarged in a first phase of the animation in order to move the unselected selection areas out of the display area on the display apparatus, and is reduced in size in a second phase of the animation in order to create the display space for displaying the additional selection areas of the submenu.

4. The multimedia system as claimed in claim 1, wherein the size of the unselected first selection areas is reduced, but the unselected first selection areas continue to be selectable using the selection apparatus.

5. The multimedia system as claimed in claim 1, wherein the selection areas comprise symbols in 3D display for identifying the selection areas.

6. The multimedia system as claimed in claim 5, wherein the 3D symbols are put into rotary motion by the animation.

7. The multimedia system as claimed in claim 1, wherein the animation continuously changes the color of at least one of the plurality of first selection areas.

8. The multimedia system as claimed in claim 1, wherein the selection apparatus is integrated into the display apparatus.

9. The multimedia system as claimed in claim 8, wherein the display apparatus comprises a touch-sensitive screen.

10. The multimedia system as claimed in claim 1, wherein the multimedia system can be retrospectively fit into the motor vehicle.

11. The multimedia system as claimed in claim 1, further comprising one or more modules selected from the group consisting of a navigation module, a map display module, a telephone module, a radio module, a CD playback module, a DVD playback module, a cassette playback module and an Internet module.

12. The multimedia system as claimed in claim 1, wherein the multimedia system is part of a motor vehicle onboard computer.

13. A method for arranging selection areas on a display apparatus in a motor vehicle multimedia system comprising the steps of:
   selecting one of a plurality of selection areas, wherein each of the selection areas relates to a particular feature of the system;
   starting an animation phase;
   during an animation phase, continuously altering the size and/or position of at least some of the displayed selection areas in order to create display space for displaying further selection areas for a submenu for the selected selection area, wherein upon display of the submenu, each of the displayed selection areas, when animated, is animated independently of the other displayed selection areas; and producing the selection areas of the submenu in an animation on the display apparatus.

14. The method as claimed in claim 13, wherein the selection areas comprise symbols in 3D display for identifying the selection areas.

15. The method as claimed in claim 14, wherein the 3D symbols are put into rotary motion during the animation phase.

16. The method as claimed in claim 14, wherein unselected first selection areas are continuously pushed out of the display area on the display apparatus by the selected selection area during the animation phase.

17. The method as claimed in claim 16, wherein the selected selection area is first enlarged in a first phase of the animation in order to push the unselected selection areas out of the display area on the screen, and is reduced in size in a second phase of the animation in order to create the display space for displaying the selection areas of the submenu.

18. The method as claimed in claim 13, wherein the unselected selection areas are continuously made smaller during the animation phase, but remain selectable even after the animation phase is complete.

19. The method as claimed in claim 14, wherein the symbol for identifying the selected selection area is continuously masked out during the animation phase.

20. The method as claimed in claim 13, further comprising the step of continuously change the color of at least one selection area during the animation phase.

* * * * *